United States Patent [19]

Moore et al.

[11] Patent Number: 4,511,347
[45] Date of Patent: Apr. 16, 1985

[54] LUBRICATION IMPROVEMENT FOR VARIABLE SPEED DRIVES

[75] Inventors: Benson R. Moore, Milwaukee; Leonard T. Gnacinski, West Allis, both of Wis.

[73] Assignee: MagneTek, Inc., Milwaukee, Wis.

[21] Appl. No.: 543,736

[22] Filed: Oct. 20, 1983

[51] Int. Cl.³ ............................................. F16H 55/56
[52] U.S. Cl. ...................................................... 474/43
[58] Field of Search ................................ 474/43, 44, 45

[56] References Cited

U.S. PATENT DOCUMENTS 1,375,053  4/1921  Lewellen ........................... 474/43
1,446,387  2/1923  Lewellen ........................ 474/43 X

FOREIGN PATENT DOCUMENTS 921462  5/1947  France ................................. 474/43
607082  5/1978  U.S.S.R. ............................. 474/43

Primary Examiner—James A. Leppink
Assistant Examiner—Frank H. McKenzie, Jr.
Attorney, Agent, or Firm—John M. Haurykiewicz

[57] ABSTRACT

An automatic grease feeding system to provide for lubrication to variable pitch pulleys is disclosed having a stationary grease feeder providing pressurized grease lubrication through a stationary to rotating interface with the shaft carrying variable pitch pulley.

4 Claims, 2 Drawing Figures

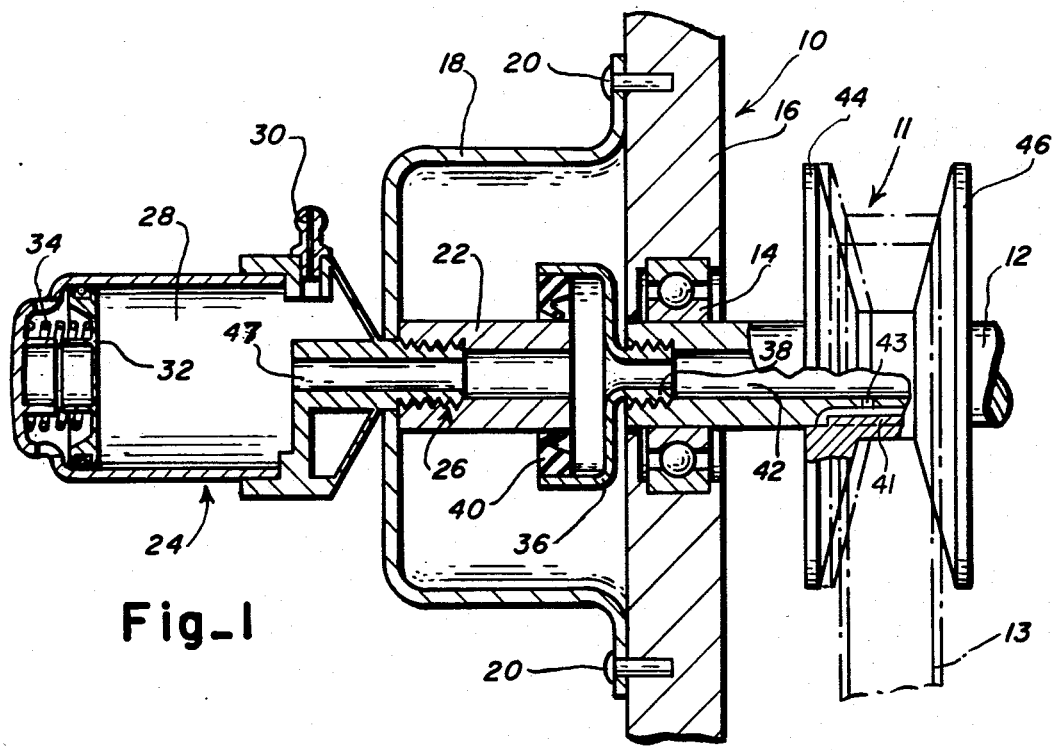
Fig_1
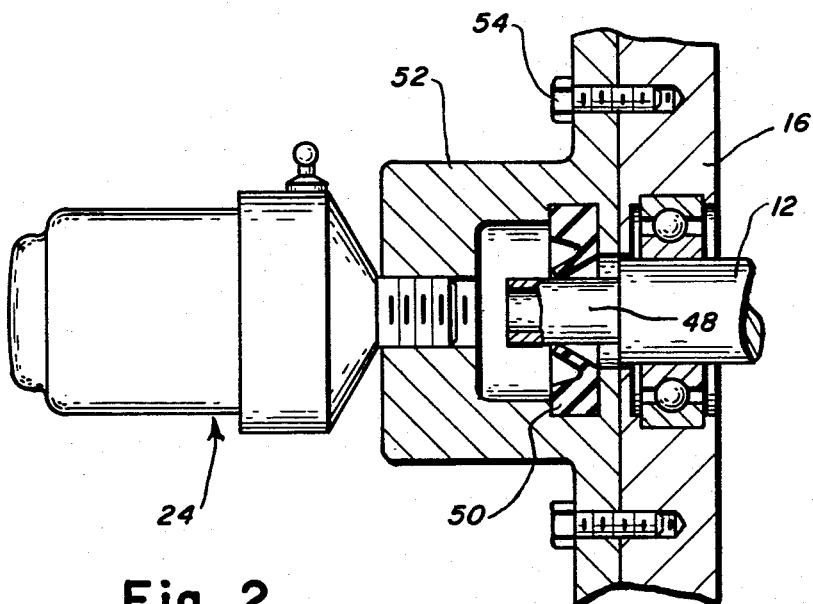
Fig_2

LUBRICATION IMPROVEMENT FOR VARIABLE SPEED DRIVES

BACKGROUND OF THE INVENTION

Prior art variable pitch pulley drive systems have suffered from an inability to provide for reliable lubrication of the variable pulley mechanism. More particularly, experience has proven that users of such systems neglect to lubricate such systems when needed, and furthermore are sometimes unable to properly lubricate the system since proper lubrication of such prior art systems required the user to adjust the pulley pitch while lubricating in order to coat all axial load bearing surfaces between the pulley and its respective shaft. The nature of some applications of such variable pitch pulley drives prohibited adjustment during lubrication.

One approach to solving this problem which is followed by a number of manufacturers has been to provide a non-metallic keyed sleeve between the axially movable pulley half and the shaft which carries it. This has resulted in some degree of success; however, rapid wearout and limited peak torque capacity have continued to be problems with this approach.

BRIEF SUMMARY OF THE INVENTION

The present invention overcomes the shortcomings of the prior art by providing an improved lubrication system for a variable pitch pulley drive system having a pressurized grease feeder delivering lubricating grease to the pulley through a rotating seal-shaft interface.

BRIEF DESCRIPTION OF THE DRAWINGS

FIG. 1 shows a partial section view of a variable pitch pulley system with the preferred embodiment of this invention.

FIG. 2 shows an alternative embodiment of this invention.

DETAILED DESCRIPTION

FIG. 1 shows a section view of a part of a variable speed drive 10 which has a variable pitch pulley 11 mounted on a shaft 12 by means of a bearing 14 journaled in an end wall 16 of an enclosure for drive 10. The pitch of pulley 11 is varied by means (not shown) to move pulley half 44 from the position shown by a solid line to the position shown by the dot-dash line. This changes the pitch diameter of belt 13, varying the drive speed. A support 18 is secured to end wall 16 by suitable means such as rivets or screws 20. Support 18 encloses a stationary hollow pipe or sleeve 22 which receives a pressurized automatic grease feeder 24 at threaded engagement 26. Grease feeder 24 has a hollow chamber 28 which may be fitted with grease by means of a conventional grease gun fitting 30. As grease is supplied through fitting 30 to chamber 28, a piston 32 is driven against coil spring 34 to the position shown.

A seal cup 36 (preferably formed as a stamping) is received in threaded engagement with shaft 12 by threads 28. Cup 36 rotates with shaft 12 and carries a rotating lip seal 40 which rides against non-rotating sleeve or cylinder 22. Shaft 12 has a hollow passageway 42 extending from the end of the shaft in engagement with cup 36 to an axially movable sheave half 44. Sheave half 46 is fixed to shaft 12 while sheave half 44 is free to move axially, being carried by splines 41 on shaft 12. Radially directed apertures 43 connect passageway 42 with the spline interconnection between sheave half 44 and shaft 12.

In operation, with cavity or chamber 28 filled with grease, piston 32 forces grease through passageway 47 in feeder 24. The grease passes through hollow sleeve 22, seal cup 36, and passageway 42 and ultimately lubricates the mating splines on sheave half 44 and shaft 12. Seal 40 prevents grease from escaping at the rotating interface.

FIG. 2 shows an alternative embodiment where shaft 12 has a hollow extension 48 secured to it. Extension 48 rotates with shaft 12 and is received in stationary seal 50. Seal 50 and grease feeder 24 are mounted in a cap 52 which is secured to machine frame 16 by conventional machine screws or bolts 54.

The invention is not to be taken as limited to all of the details thereof as modifications and variations thereof may be made without departing from the spirit or scope of the invention. Accordingly,

What is claimed is:

1. In a variable speed drive of the type having shaft-mounted variable pitch pulleys interconnected by a drive belt contained within an enclosure, the improvement of a lubrication system for lubricating the variable pulley mechanism in combination therewith comprising:
   (a) a pressurized grease feeder secured to the enclosure of said drive,
   (b) a seal mounted between said grease feeder and a pulley shaft to prevent escape of lubricating grease and to permit rotation of said pulley shaft,
   (c) a sheave half having a spline interconnection to said pulley shaft, and
   (d) a hollow passageway in said pulley shaft communicating pressurized grease from said feeder to said spline interconnection.

2. The improvement of claim 1 wherein the seal is mounted on and rotates with said pulley shaft.

3. The improvement of claim 2 wherein the seal is mounted to the enclosure of said drive.

4. The improvement of claim 1 wherein a hollow shaft extension is interposed between said pulley shaft and said seal.

* * * * *